United States Patent
Sasaki

(10) Patent No.: US 12,217,062 B2
(45) Date of Patent: Feb. 4, 2025

(54) INFORMATION PROCESSING APPARATUS EQUIPPED WITH STORAGE UNIT STORING SWAP FILE, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Hidemi Sasaki, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 77 days.

(21) Appl. No.: 18/067,999

(22) Filed: Dec. 19, 2022

(65) Prior Publication Data

US 2023/0229455 A1     Jul. 20, 2023

(30) Foreign Application Priority Data

Jan. 14, 2022 (JP) ................................. 2022-004478

(51) Int. Cl.
*G06F 9/4401* (2018.01)
*G06F 3/06* (2006.01)

(52) U.S. Cl.
CPC .......... *G06F 9/4411* (2013.01); *G06F 3/0616* (2013.01); *G06F 3/0634* (2013.01); *G06F 3/0673* (2013.01)

(58) Field of Classification Search
CPC .... G06F 9/4411; G06F 3/0616; G06F 3/0634; G06F 3/0673
See application file for complete search history.

(56) References Cited

U.S. PATENT DOCUMENTS

| 2017/0220404 | A1* | 8/2017 | Polar Seminario ......................... G06F 11/0751 |
| 2021/0321012 | A1* | 10/2021 | Sasaki ................... G06F 9/5027 |
| 2022/0121437 | A1* | 4/2022 | Tokumoto ................. G06F 8/65 |
| 2023/0132494 | A1* | 5/2023 | Yagi ........................ G06F 8/654 717/170 |

FOREIGN PATENT DOCUMENTS

JP     2005309791 A     11/2005

* cited by examiner

*Primary Examiner* — Nimesh G Patel
(74) *Attorney, Agent, or Firm* — ROSSI, KIMMS & McDOWELL LLP

(57) ABSTRACT

An information processing apparatus that is capable of reducing deterioration of usability resulting from booting in a boot mode that is different from a boot mode of the last boot time. The information processing apparatus includes a memory, a storage unit that stores a swap file used as a substituted storage area of the memory, and at least one processor that executes instructions stored in the memory to set either of a first boot mode that preferentially secures an area storing a temporary file in the storage unit and a second boot mode that preferentially secures an area storing the swap file in the storage unit, and adjust a size of the swap file depending on a boot mode set.

13 Claims, 8 Drawing Sheets

FIG. 2

| Partition Name | Purpose | Size |
|---|---|---|
| (boot) | Kernel etc. | 47 MB |
| p1 | User Setting | 5 MB |
| p2 | Safe System | 80 MB |
| p3 | Std System | 1493 MB |
| p4 | (Extension) | 14000 MB |

| Partition Name | Purpose | Size |
|---|---|---|
| p5 | User Application | 4000 MB |
| p6 | PDL Reception Buffer | 4000 MB |
| p7 | Temporary Print Data | 2000 MB |
| p8 | Shared by Swap File and Temporary File | 4000 MB |

INFORMATION PROCESSING APPARATUS EQUIPPED WITH STORAGE UNIT STORING SWAP FILE, CONTROL METHOD THEREFOR, AND STORAGE MEDIUM STORING CONTROL PROGRAM THEREFOR

BACKGROUND OF THE INVENTION

Field of the Invention

The present invention relates to an image processing apparatus equipped with a storage unit storing a swap file, a control method therefor, and a storage medium storing a control program therefor.

Description of the Related Art

An information processing apparatus provides various functions to a user because a CPU executes programs stored in a RAM (Random Access Memory) that enables high speed access while referring to data stored in the RAM. In recent years, a multitask OS that enables parallel operations of a plurality of programs is used in order to provide various functions. Ideally, all programs executed by a CPU and all data required of the programs are preferably stored in a RAM.

However, actually, capacity of a RAM mounted in an information processing apparatus is restricted due to restrictions of a manufacturing cost and specifications of a CPU and an OS. Accordingly, a "memory swap" that allocates a part of a storage unit, such as a hard disk or an eMMC (embedded Multi Media Card), to a substitutional storage area (swap space) is used. A unit price per capacity of the storage unit is cheaper than that of a RAM. For example, Japanese Laid-Open Patent Publication (Kokai) No. 2005-309791 (JP 2005-309791A) discloses a technique that secures a swap space as a file on a file system. A capacity of a swap file needed during a system operation is calculated, and the swap space of the calculated capacity is secured at a next boot time. This enables access at a speed as high as possible even when a storage unit like a hard disk that takes time to seek is used.

Moreover, an information processing apparatus that is provided with a small-capacity storage unit of which a storage area is exclusively used by a swap file and a temporary file is developed as a configuration that reduces manufacturing cost more. This information processing apparatus is activated in any one of a first boot mode that secures an area storing a temporary file in the storage unit and a second boot mode that secures an area storing a swap file as a substitution of a RAM in the storage unit.

Thereby, when the information processing apparatus is booted in the first boot mode, the swap file as a substitution of a RAM is deleted from the storage unit, which enables to secure an area storing a large-capacity temporary file, such as compressed data etc. that are needed to update firmware, in the storage unit. Moreover, when the information processing apparatus is booted in the second boot mode, a swap file is stored in the storage unit and the swap file can be used as a storage area of substitution of the RAM.

However, the above-mentioned configuration that is booted in any one of the first boot mode and second boot mode may deteriorate usability when the apparatus is booted in a boot mode that is different from the boot mode at the last boot time.

For example, when the apparatus is booted in the second boot mode that is different from the first boot mode at the last boot time, a swap file is generated. In generating a swap file, a process that writes dummy data in a storage area allocated to the swap file in the storage unit is performed. Accordingly, the boot process takes longer time as compared with a case where the apparatus is booted in the same boot mode as the last boot time, which deteriorates the usability.

SUMMARY OF THE INVENTION

The present invention provides an information processing apparatus, a control method therefor, and a storage medium storing a control program therefor, which are capable of reducing deterioration of usability resulting from booting in a boot mode that is different from a boot mode of the last boot time.

Accordingly, an aspect of the present invention provides an information processing apparatus including a memory, a storage unit configured to store a swap file used as a substituted storage area of the memory, and at least one processor that executes instructions stored in the memory to set either of a first boot mode that preferentially secures an area storing a temporary file in the storage unit and a second boot mode that preferentially secures an area storing the swap file in the storage unit, and adjust a size of the swap file depending on a boot mode set.

According to the present invention, the deterioration of the usability is reduced in the configuration where a storage area is exclusively used by a swap file and a temporary file.

Further features of the present invention will become apparent from the following description of exemplary embodiments with reference to the attached drawings.

BRIEF DESCRIPTION OF THE DRAWINGS

FIG. 2 is a view describing a storage area of a built-in storage unit in FIG. 1.

DESCRIPTION OF THE EMBODIMENTS

Figure 1:
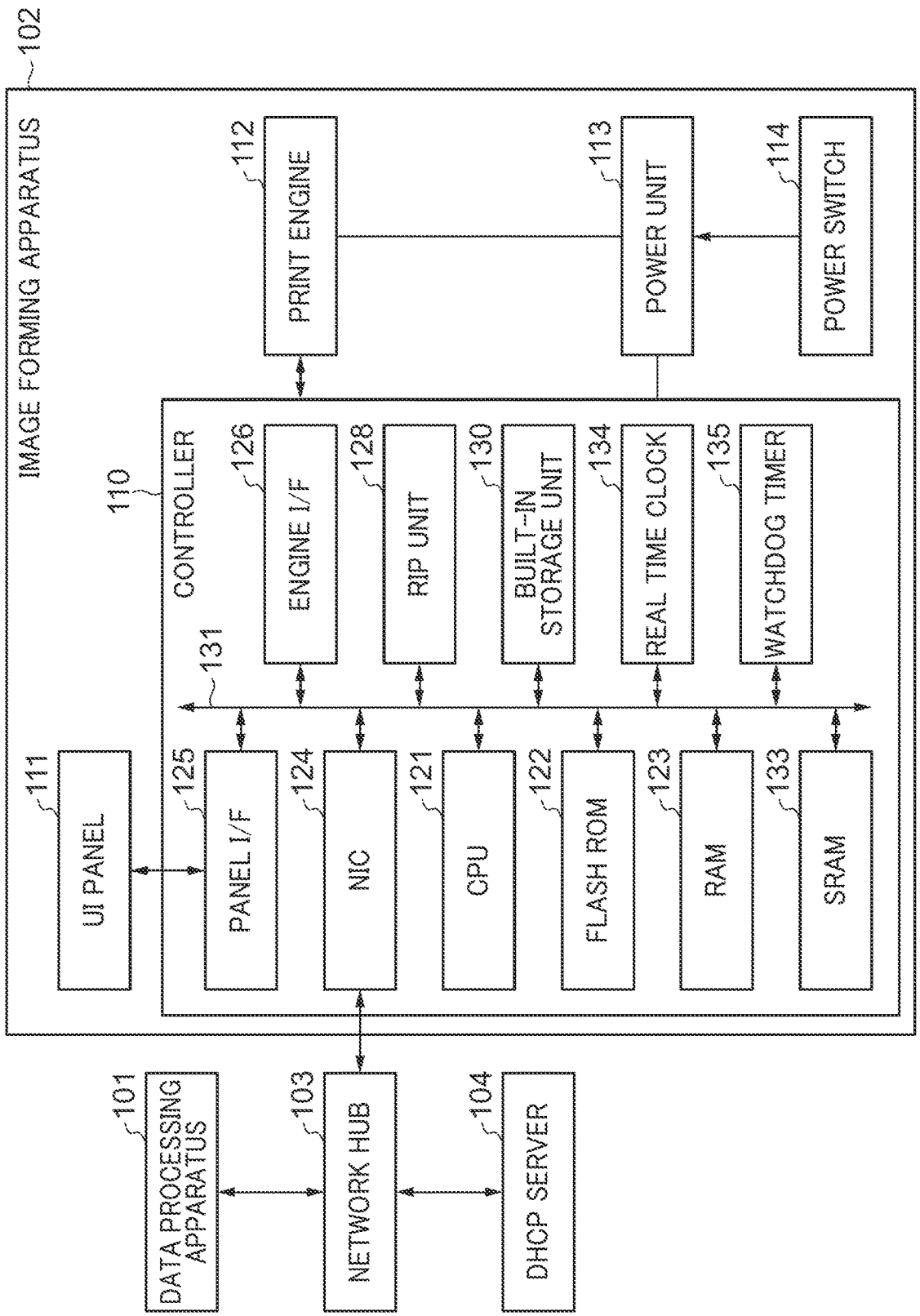
FIG. 1 is a block diagram schematically showing a configuration of an image forming apparatus as an information processing apparatus according to an embodiment.

Hereafter, embodiments according to the present invention will be described in detail by referring to the drawings. It should be noted that the following embodiment does not restrict the invention defined by the claims and not all combinations of characteristic features described in the embodiment are indispensable to the solution of the present invention. Although the embodiment is described using an image forming apparatus, such as a multifunction apparatus or a printer, as an example of an information processing apparatus, this is not indispensable. The present invention is applicable to information processing apparatuses, such as a projector, a scanner, a camera, an automatic vending machine, a refrigerator, and a smart phone, other than an image forming apparatus. Moreover, the embodiment is described using Linux (registered trademark) that is widely diffused as an OS of an information processing apparatus.

FIG. 1 is a block diagram schematically showing a configuration of an image forming apparatus 102 as the information processing apparatus according to the embodiment.

As shown in FIG. 1, the image forming apparatus 102 is connected to a data processing apparatus 101 and a DHCP (Dynamic Host Configuration Protocol) server 104 through a network hub 103.

The network hub 103 enables network communication between the data processing apparatus 101, image forming apparatus 102, and DHCP server 104. Although the embodiment describes a local network configuration in which the data processing apparatus 101, image forming apparatus 102, and DHCP server 104 are connected to the single network hub 103, this configuration is not indispensable. For example, another network configuration using a plurality of network hubs may be employed.

The data processing apparatus 101 is a PC (Personal Computer) that generates PDL (Print Description Language) data and transmits the PDL data concerned to the image forming apparatus 102, for example. Moreover, the data processing apparatus 101 transmits compressed data updating firmware of the image forming apparatus 102 to the image forming apparatus 102 in a process that updates the firmware of the image forming apparatus 102. The DHCP server 104 receives an obtainment request of network setting information according to the DHCP and replies the network setting information.

The image forming apparatus 102 is a laser beam printer that receives PDL data from the data processing apparatus 101 and forms an image based on the received PDL data (image data), for example. It should be noted that the image forming apparatus 102 may be a multifunction apparatus equipped with a plurality of functions, such as a copy function, a scanner function, and a facsimile function. The image forming apparatus 102 consists of a controller 110, a UI (User Interface) panel 111, a print engine 112, a power unit 113, and a power switch 114.

The controller 110 is a controller board that generates bitmap data for print on the basis of the PDL data received from the data processing apparatus 101 and transmits the bitmap data concerned to the print engine 112. It should be noted that the controller 110 can generate PDL data by itself and can issue a print instruction in order to print settings and states of the image forming apparatus 102 as a report.

The UI panel 111 is provided with a display unit (not shown) that gives a user various pieces of information and an operation unit (not shown) that receives various operations from a user. For example, the UI panel 111 may be provided with a touch panel in addition to physical buttons. The image forming apparatus 102 may have a function that notifies a user of an error or a warning of the image forming apparatus 102 by lighting or blinking an LED (Light Emitting Diode) provided in the UI panel 111. Moreover, the image forming apparatus 102 may have a function that notifies a user of an error or a warning of the image forming apparatus 102 by emitting alarm from a buzzer provided in the UI panel 111.

The print engine 112 forms an image on a sheet with an electrophotographic system on the basis of the bitmap data received from the controller 110. The image formation system may be an ink jet system that uses ink as a recording medium instead of the electrophotographic system that uses toner as a recording medium. Moreover, the print engine 112 may be configured to enable color print by providing a plurality of color recording materials. Furthermore, the print engine 112 may be provided with a plurality of sheet feed cassettes and may be configured to feed a sheet from a sheet feed cassette designated by PDL data from among the sheet feed cassettes.

The power unit 113 supplies electric power to respective components that constitute the image forming apparatus 102. The power unit 113 generates voltage required to operate the components and plays a role that supplies the voltage concerned. The power switch 114 accepts a power supplying instruction and a power interruption instruction from a user. For example, when the user presses the power switch 114 in a power off state of the image forming apparatus 102, the power unit 113 is notified of a power switch press event. Then, the power unit 113 starts supplying the electric power to the respective components that constitute the image forming apparatus 102.

The controller 110 is provided with a CPU 121, a Flash ROM (Flash Read Only Memory) 122, a RAM 123 as a memory, an SRAM (Static Random Access Memory) 133, an NIC 124, and a panel I/F 125. The controller 110 is further provided with an engine I/F 126, an RIP unit 128, a built-in storage unit 130 as a storage unit, and a real time clock 134. In addition, the controller 110 is provided with a watch dog timer 135. The controller 110 includes a bus 131 that connects these components.

The CPU 121 is a central processing unit for running various programs. The flash ROM 122 is a nonvolatile memory that holds an initial program that is executed by reset release of the CPU 121 as a trigger. The RAM 123 is a volatile memory that stores temporary information during operations of various programs by the CPU 121. The SRAM 133 is a volatile memory that holds data while supplying an electric current to the image forming apparatus 102.

The NIC 124 is a network interface controller that is mutually connected to a device outside the image forming apparatus 102 through a network and relays data communication (i.e., transmission and a reception of data) between both sides. The image forming apparatus 102 may be provided with a communication means that achieves wireless connection in addition to a communication means that achieves wired connection in the embodiment.

The panel I/F 125 is an interface for connecting the UI panel 111 and the controller 110 mutually and for relaying data communication (i.e., transmission and a reception of data) between both sides. The engine I/F 126 is an interface for connecting the print engine 112 and the controller 110 mutually and for relaying data communication (i.e., transmission and a reception of data) between both sides.

The RIP unit 128 converts intermediate data into bitmap data and develops the bitmap data concerned to the RAM 123. Although the configuration where the dedicated RIP unit 128 that is independent from the CPU 121 converts the intermediate data into the bitmap data is described in the embodiment, the image forming apparatus 102 may not have the RIP unit 128. When the image forming apparatus 102 does not have the RIP unit 128, the CPU 121 performs the process that converts the PDL data received from the data processing apparatus 101 into the bitmap data.

The built-in storage unit 130 is a nonvolatile storage device that holds the OS (Operating System) activated from the initial program. The built-in storage unit 130 is an eMMC, a hard disk, or a solid state drive, for example. The built-in storage unit 130 can secure a large-capacity storage area relatively cheaply. Accordingly, the built-in storage unit 130 stores the program of the OS and data used by the OS. The details of the built-in storage unit 130 are described by referring to FIG. 2.

The real time clock 134 is a hard chip for managing time information in the image forming apparatus 102 in a non-volatile manner. The real time clock 134 is driven by electric power supplied from a battery that is a power source independent from the power unit 113. Accordingly, the real time clock 134 is able to update the time information periodically even after the power of the image forming apparatus 102 is turned OFF.

FIG. 2 is a view describing a storage area of the built-in storage unit 130 in FIG. 1. The storage area of the built-in storage unit 130 is divided into an out-of-partition area, three primary partitions, and an extended partition and is managed. The out-of-partition area "boot" holds firmware like Linux Kernel.

The primary partition p1 is an area for managing setting information about a user. The primary partition p2 is an area for storing a program, a library, and data used for updating the image forming apparatus 102. The primary partition p3 is an area for storing a program, a library, and data used for an image forming process of the image forming apparatus 102.

The extended partition p4 is an area for managing logical partitions p5 through p8. The logical partition p5 is an area for storing a user application. The logical partition p6 is an area for buffering in order to receive PDL data. The logical partition p7 is an area for storing image data when performing hold print, copy print, etc. The logical partition p8 is an area for storing a swap file and a temporary file.

Hereinafter, the above-mentioned boot mode will be complemented. There are some known information processing apparatuses having a function that switches some boot modes according to objects. For example, the image forming apparatus 102 is activated in a normal boot mode or one of maintenance modes. The normal boot mode is a boot mode for providing normal functions of the image forming apparatus 102, such as a copy function, a scanner function, and a facsimile function. In the normal boot mode, a system application of the image forming apparatus 102, a user application, etc. are read to the RAM 123 and are executed.

Particularly, a plurality of applications that use large memory capacities may be executed simultaneously in the normal boot mode. Accordingly, a memory swap function is activated in the normal boot mode so as to generate a swap file in the logical partition p8 of the built-in storage unit 130. The swap file is used as a substituted storage area when the memory capacity of the RAM 123 runs short. Even in the normal boot mode, temporary data like a log file may be stored in the logical partition p8 for inspection of an occurred problem.

In the meantime, the maintenance modes are boot modes for maintaining and preserving hardware or software of the image forming apparatus 102 so that the image forming apparatus 102 will normally operate in the normal boot mode. For example, the maintenance modes include an update mode, a factory mode, and a degenerate mode. The update mode is a boot mode for updating the firmware of the image forming apparatus 102. In the update mode, it is necessary to secure a storage area for storing a large-capacity temporary file like downloaded compressed data etc. in the built-in storage unit 130 preferentially.

Moreover, the factory mode is a boot mode used in assembling the image forming apparatus 102 at a factory and used in inspecting the image forming apparatus 102. In the factory mode, it is necessary to secure a storage area for storing a temporary file like temporary log data during inspection preferentially.

Furthermore, the degenerate mode is used to boot the image forming apparatus 102 while restricting a part of the functions in a case where a problem occurs in the hardware or the software during the operation in the normal boot mode. For example, the image forming apparatus 102 boots the system application but does not boot a part of user applications so as to try to boot with the minimum configuration in the degenerate mode. This can separate the hardware or the software that causes a problem from the system of the image forming apparatus, which enables inspection of the cause that avoids the boot or use under a limited condition.

In the degenerate mode, it is preferable to separate the memory swap function in order to simplify the configuration more. Moreover, it is necessary to preferentially secure a storage area for storing a temporary file of temporary log data in the built-in storage unit 130 in order to use for cause inspection.

In a maintenance mode, it is possible to delete the swap file stored in the logical partition p8 of the built-in storage unit 130 in order to secure the storage area for storing a temporary file in the built-in storage unit 130. However, if the swap file stored in the logical partition p8 is deleted in the maintenance mode, usability may be deteriorated when the image forming apparatus is booted in a boot mode that is different from a boot mode of the last boot time.

For example, when the image forming apparatus that was booted in the maintenance mode at the last boot time is rebooted in the normal boot mode, a swap file is generated. In generating a swap file, a process that writes dummy data in a storage area allocated to the swap file in the built-in storage unit 130 is performed. Accordingly, the boot process takes longer time as compared with a case where the apparatus is booted in the same boot mode of the last boot time, which deteriorates the usability.

As compared with this, in the embodiment, when the boot mode that preferentially secures an area storing a temporary file in the built-in storage unit 130 is set, a part of the swap file stored in the built-in storage unit 130 is deleted on the basis of the status of use of the built-in storage unit 130. When the boot mode that secures an area storing a swap file in the built-in storage unit 130 is set, the swap file concerned is complemented so that the size of the swap file stored in the built-in storage unit 130 will become a prescribed swap file size.

Figure 3:
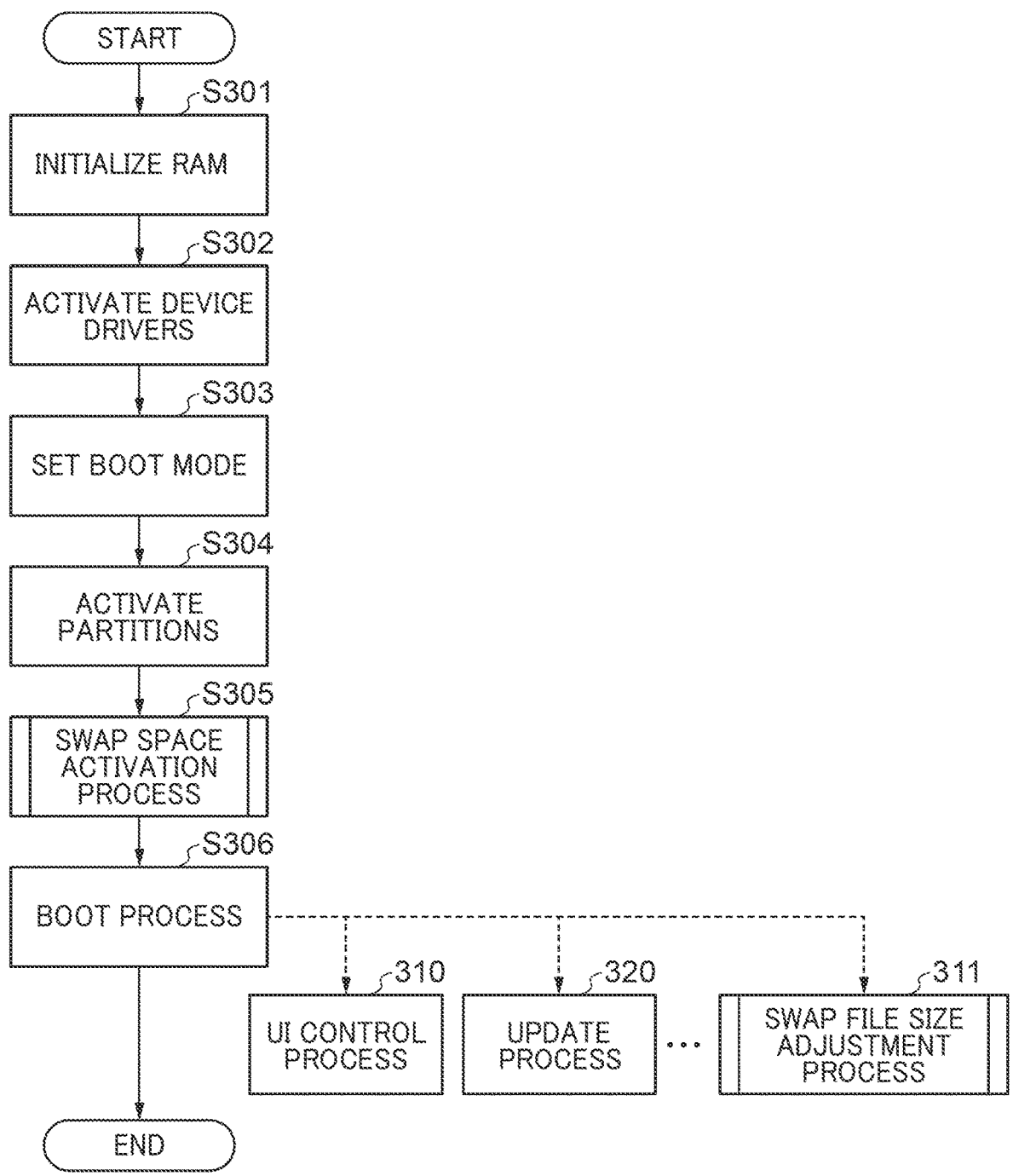
FIG. 3 is a flowchart showing procedures of an initialization sequence performed by the image forming apparatus in FIG. 1.

FIG. 3 is a flowchart showing procedures of an initialization sequence performed by the image forming apparatus 102 in FIG. 1. The process in FIG. 3 is achieved because the CPU 121 runs a program stored in the flash ROM 122 etc.

In FIG. 3, the CPU 121 initializes the RAM 123 first (a step S301). In the step S301, a region for managing writing to the RAM 123 based on an intended purpose of the memory is generated, for example. Next, the CPU 121 activates programs and device drivers that control various devices of the image forming apparatus 102 (a step S302). This enables the CPU 121 to refer to programs and data stored in the built-in storage unit 130.

Next, the CPU 121 sets the boot mode (a step S303). In the step S303, the CPU 121 sets the boot mode on the basis of a boot instruction received from a user. For example, when the image forming apparatus 102 in a power OFF state accepts the boot instruction that is press of the power switch 114 by the user, the CPU 121 sets a boot mode to the normal boot mode.

Moreover, when the user performs a special operation that is a boot instruction of a maintenance mode, the CPU 121 sets a boot mode to the mode corresponding to the special operation accepted. In the embodiment, a set value showing a boot mode that will be designated at the next boot time may be stored in the built-in storage unit 130. In such a case, the CPU 121 may set a boot mode on the basis of the set value in the step S303.

Next, the CPU 121 activates (i.e., mounts) the respective partitions of the built-in storage unit 130 (a step S304). This enables the CPU 121 to refer to contents of the partitions shown in FIG. 2 through the file system of the image forming apparatus 102.

Next, the CPU 121 performs a swap space activation process mentioned later in FIG. 4 (a step S305) and activates the swap file stored in the built-in storage unit 130. This enables the CPU 121 to store a program and data required in running the program in not only the RAM 123 but also the swap space in running the program.

Figure 5:
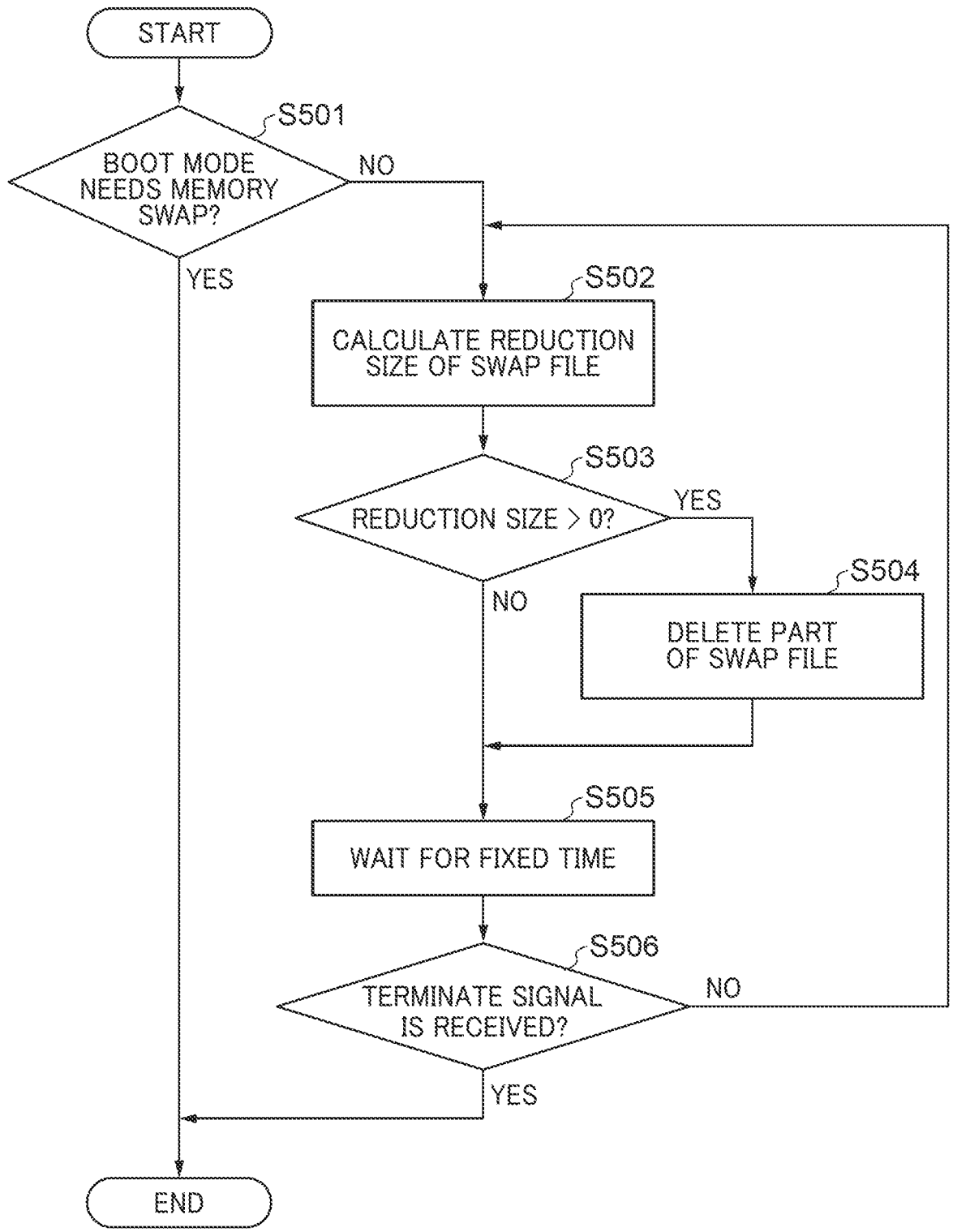
FIG. 5 is a flowchart showing procedures of a swap file size adjustment process executed in a step S306 in FIG. 3.

Next, the CPU 121 boots processes for achieving various services (a step S306). In the step S306, a UI control process 310 for controlling the UI panel 111, an update process 320 for updating the firmware, and a swap file size adjustment process 311 mentioned later in FIG. 5 are booted. This enables the image forming apparatus 102 to provide various functions to the user. In the step S306, a process relevant to the boot mode set in the step S303 among a plurality of processes including the UI control process 310, update process 320, and swap file size adjustment process 311 may be booted. After that, this process is finished.

Figure 4:
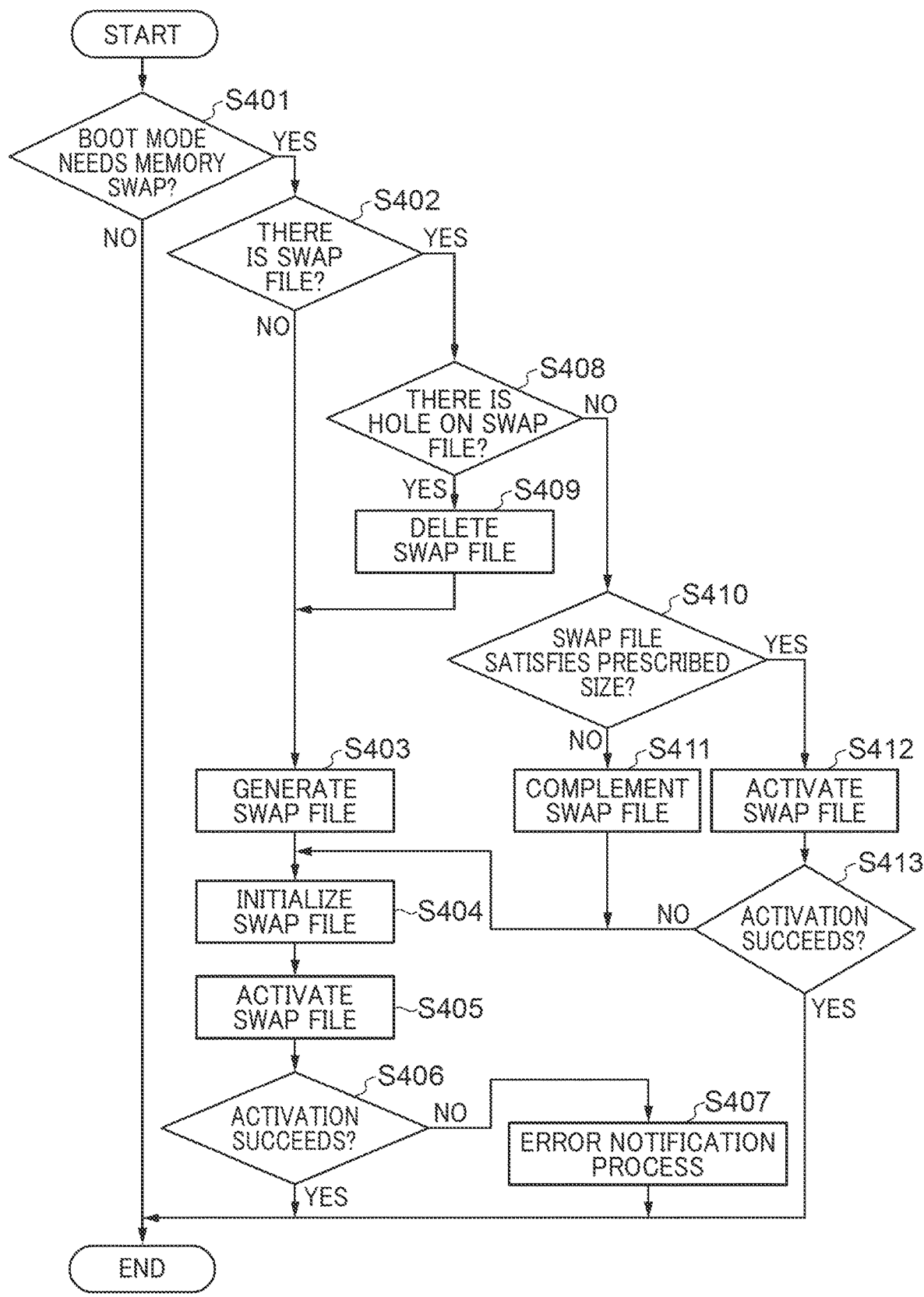
FIG. 4 is a flowchart showing procedures of a swap space activation process in a step S305 in FIG. 3.

FIG. 4 is a flowchart showing procedures of the swap space activation process in the step S305 in FIG. 3.

As shown in FIG. 4, the CPU 121 determine whether the boot mode set in the step S303 needs a memory swap (a step S401). In the step S401, when the boot mode set in the step S303 is the normal boot mode that needs to secure a storage area as substitution of the RAM 123 in the built-in storage unit 130, the CPU 121 determines that the boot mode needs the memory swap, for example. In the meantime, when the boot mode set in the step S303 is a maintenance mode that needs to secure a storage area storing a temporary file in the built-in storage unit 130 preferentially, the CPU 121 determines that the boot mode does not need the memory swap.

When it is determined that the boot mode set in the step S303 does not need the memory swap in the step S401, the CPU 121 finishes this process and the process proceeds to the step S306 mentioned above.

When it is determined that the boot mode set in the step S303 needs the memory swap in the step S401, the CPU 121 determines whether there is a swap file (a step S402). In the step S402, when the swap file is stored in the logical partition p8, the CPU 121 determines that there is a swap file. In the meantime, when the swap file is not stored in the logical partition p8, the CPU 121 determines that there is no swap file.

When it is determined that there is no swap file in the step S402, the CPU 121 generates a swap file in the logical partition p8 (a step S403). The CPU 121 writes dummy data of the prescribed swap file size in the generated swap file. Thereby, the storage area of the prescribed swap file size is allocated in the logical partition p8 of the built-in storage unit 130. The prescribed swap file size may be set beforehand or may be determined in booting on the basis of various kinds of information about the storage area of the built-in storage unit 130. In the embodiment, the prescribed swap file size shall be 2000 MB as an example.

Next, the CPU 121 initializes the swap file (a step S404). The initialization of the swap file is executed by a mkswap command, for example, in the Linux environment. When the swap file is initialized, metadata for managing the swap file is written in a head part of the swap file. Next, the CPU 121 activates the swap file (a step S405). The activation of the swap file is executed by a swapon command, for example, in the Linux environment. Next, the CPU 121 determines whether the activation succeeded (a step S406).

When it is determined that the activation of the swap file succeeds in the step S406, the CPU 121 finishes this process. When it is determined that the activation of the swap file does not succeed in the step S406, the CPU 121 performs an error notification process (a step S407). For example, the CPU 121 notifies a module storing a log in the system of an error message. Otherwise, the CPU 121 displays a warning message on the UI panel 111 directly or indirectly. After that, this process is finished.

When it is determined that there is a swap file in the step S402, the CPU 121 determines whether there is an area (hereinafter referred to as a "hole") to which a storage area is not allocated on the swap file (a step S408).

When it is determined that there is a hole on the swap file in the step S408, the CPU 121 deletes the swap file from the logical partition p8 (a step S409). Next, the process proceeds to the above-mentioned step S403 in which the swap file is generated.

When it is determined that there is no hole on the swap file in the step S408, the CPU 121 determines whether the size of the swap file satisfies the prescribed swap file size (a step S410).

When it is determined that the size of the swap file is less than the prescribed swap file size in the step S410, the CPU 121 complements the swap file (a step S411). Specifically, the CPU 121 additionally writes dummy data to the swap file so that the size of the swap file will become the prescribed swap file size. When the size of the swap file exceeds the prescribed swap file size, the CPU 121 may control to adjust the size of the swap file so that the size of the swap file will become the prescribed swap file size. Next, the process proceeds to the above-mentioned step S404 in which the swap file is initialized. When it is determined that the size of the swap file satisfies the prescribed swap file size in the step S410, the CPU 121 activates the swap file (a step S412) in the same manner as the step S405. Next, the CPU 121 determines whether the activation succeeds (a step S413).

When it is determined that the activation of the swap file does not succeed in the step S413, the process proceeds to the above-mentioned step S404 in which the swap file is initialized. When it is determined that the activation of the swap file succeeds in the step S413, the CPU 121 finishes this process.

FIG. 5 is a flowchart showing procedures of the swap file size adjustment process 311 executed in the step S306 in FIG. 3. It should be noted that another process is executed in parallel with the swap file size adjustment process 311 in the embodiment. For example, when the boot mode set in the above-mentioned step S303 is the update mode in the configuration that controls an operation of a process on the basis of the boot mode set in the step S303, the update process 320 is executed in parallel with the swap file size adjustment process 311.

As shown in FIG. 5, the CPU 121 determine whether the boot mode set in the step S303 needs the memory swap (a step S501). It should be noted that the determination method in the step S501 is the same as that in the step S401.

When it is determined that the boot mode set in the step S303 needs the memory swap in the step S501, this process is finished. When it is determined that the boot mode set in the step S303 does not need the memory swap in the step S501, the CPU 121 calculates a reduction size of the swap file (a step S502).

When the boot mode set in the step S303 is one of the maintenance modes, it is determined that the boot mode does not need the memory swap in the step S501. In these boot modes, it is necessary to positively secure a storage area storing a temporary file in the built-in storage unit 130. Accordingly, it is preferable to secure a possible storage area storing a temporary file in the built-in storage unit 130 by reducing data (a swap file, specifically) that is not used when the apparatus is booted in one of these boot modes.

In the embodiment, the reduction size of the swap file is calculated in the step S502. The reduction size of the swap file becomes a value calculated by subtracting a size of a free space in the logical partition p8 from the predetermined minimum size of a free space that should be secured. For example, when the minimum size of the free space that should be secured is 300 MB and the free space in the logical partition p8 is 250 MB, the reduction size of the swap file becomes 50 MB that is calculated by subtracting 250 MB from 300 MB. A more concrete example will be mentioned later using FIG. 6.

Next, the CPU 121 determine whether the calculated reduction size of the swap file is larger than "0" (a step S503). When the calculated reduction size of the swap file is larger than "0", the CPU 121 determines that the reduction of the swap file is needed. In the meantime, when the calculated reduction size of the swap file is equal to or less than "0", the CPU 121 determines that the reduction of the swap file is not needed.

When it is determined that the calculated reduction size of the swap file is equal to or less than "O" in the step S503, the process proceeds to a step S505 mentioned later. When it is determined that the calculated reduction size of the swap file is larger than "O" in the step S503, the CPU 121 deletes a part of the swap file stored in the logical partition p8 (a step S504). Specifically, the CPU 121 releases an area equivalent to the calculated reduction size of the swap file in the storage area allocated to the swap file in the logical partition p8. For example, the CPU 121 releases the area equivalent to the reduction size of the swap file from the end of the swap file by a truncate ( ) function in the Linux environment.

Next, the CPU 121 waits for a fixed time (a step S505). This is the waiting time for allocating sufficient calculation resource to another process that is running in parallel with the swap file size adjustment process 311. Next, the CPU 121 determines whether a terminate signal is received from the other process running in parallel with the swap file size adjustment process 311 (a step S506. It should be noted that the terminate signal is a termination request of the program.

When it is determined that the terminate signal is not received in the step S506, the process returns to the step S502 and the monitoring of the free space in the logical partition p8 is continued. At this time, the other process running in parallel with the swap file size adjustment process 311 can store a temporary file in the logical partition p8. For example, when the other process is the update process 320, compressed data updating the firmware and backup data of current firmware are stored in the logical partition p8.

Moreover, when the above-mentioned compressed data is received from an external apparatus, the compressed data is temporarily developed to the logical partition p8 so as to calculate a checksum and verify a signature in order to verify the validity of the compressed data concerned. Moreover, when the other process is a factory mode, a log generated by an operation of a self-diagnostics process is stored in the logical partition p8. It should be noted that a self-diagnostics result about a device is recorded in this log, for example.

When it is determined that the terminate signal is received in the step S506, this process is finished.

According to the embodiment, when the boot mode that preferentially secures an area storing a temporary file in the built-in storage unit 130 is set, a part of the swap file stored in the built-in storage unit 130 is deleted on the basis of the status of use of the built-in storage unit 130. When the boot mode that secures an area storing a swap file in the built-in storage unit 130 is set, the swap file concerned is complemented so that the size of the swap file stored in the built-in storage unit 130 will become a prescribed size.

Namely, when the apparatus is booted in a boot mode different from a boot mode of the last boot time, it is sufficient to generate a part of the swap file and it is unnecessary to generate the whole swap file. This can shorten a period required to regenerate the swap file when the apparatus is booted in a boot mode different from a boot mode of the last boot time. Thereby, the degradation of the usability resulting from the boot in a boot mode different from a boot mode of the last boot time can be reduced.

Moreover, the boot mode in which the area storing a temporary file is preferentially secured in the built-in storage unit 130 is the update mode in the above-mentioned embodiment. Thereby, the area storing compressed data etc. that are needed for updating the firmware is securable in the built-in storage unit 130 while reducing the degradation of the usability.

Moreover, the boot mode in which the area storing a temporary file is preferentially secured in the built-in storage unit 130 is the factory mode in the above-mentioned embodiment. Thereby, the area storing temporary log data etc. for inspection is securable in the built-in storage unit 130 while reducing the degradation of the usability.

Moreover, the boot mode in which the area storing a swap file is secured in the built-in storage unit 130 is the normal boot mode in the above-mentioned embodiment. Thereby, the substituted storage area that is used when the memory capacity of the RAM 123, which is a read destination of the applications executed in parallel, runs short, is secured in the built-in storage unit 130 while reducing the degradation of the usability.

Figure 6:
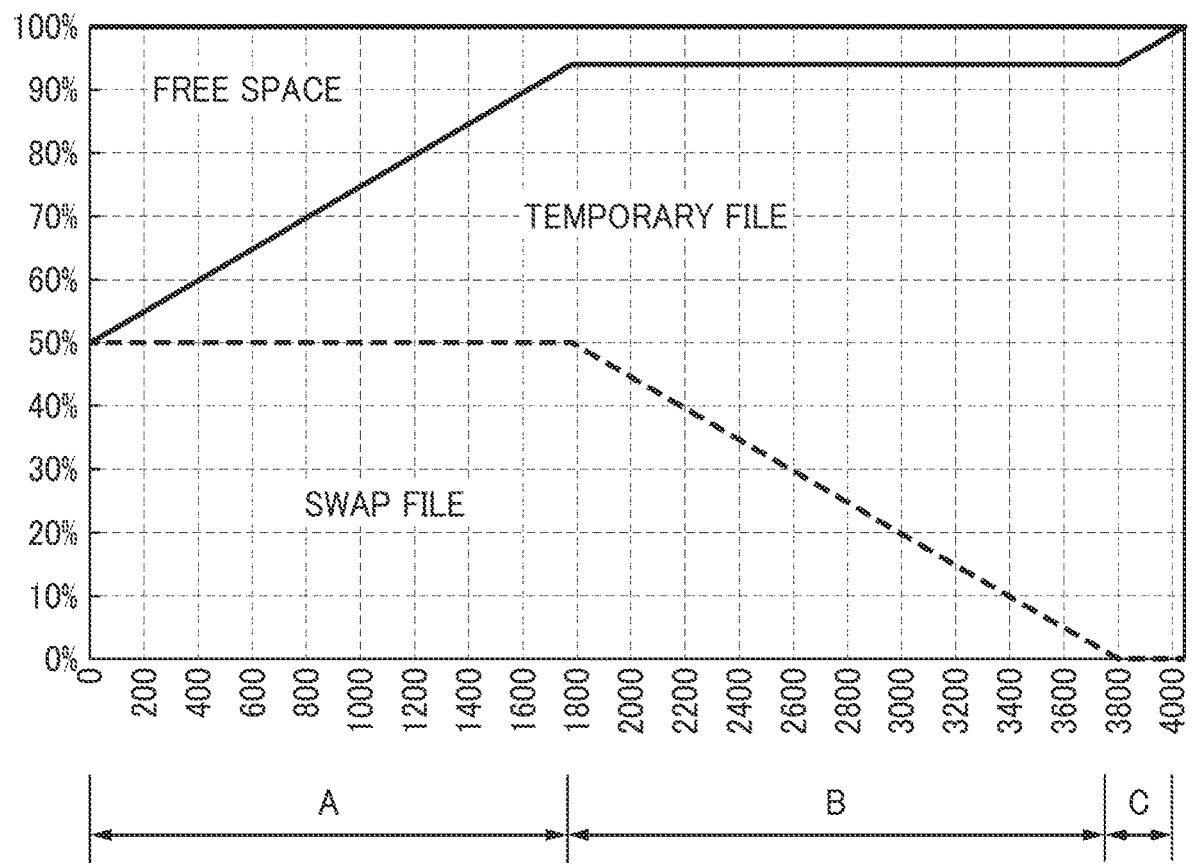
FIG. 6 is a view describing reduction of a swap file in the embodiment.

FIG. 6 is a view describing reduction of a swap file in the embodiment. In FIG. 6, a horizontal axis shows a maximum use amount of a temporary file in the logical partition p8. A vertical axis shows ratios of areas allocated in the logical partition p8. The ratio of the free space, the ratio of an area allocated to a temporary file, and the ratio of an area allocated to a swap file are shown in the order from the top in FIG. 6.

It should be noted that FIG. 6 shows a case where the use amount of the temporary file increases monotonically as an example in order to simplify description. In the embodiment, the size of the logical partition p8 shall be 4000 MB, the swap file prescribed size shall be 2000 MB, and the minimum size of the free space that should be secured shall be 300 MB.

Immediately after starting the swap file size adjustment process 311, when a temporary file of another process is not stored in the logical partition p8, the storage area of 2000

MB in the logical partition p8 is allocated to the swap file and the remaining area of 2000 MB becomes a free space.

In the logical partition p8, the free space is allocated to the temporary file until the size of the free space reaches the minimum size (300 MB) of the free space that should be secured (see a section A in FIG. 6, for example). At this time, the swap file maintains the state immediately after booting, and can be reused at a next boot time. That is, regeneration of the swap file is unnecessary and frequency of the regeneration of the swap file is reduced.

When the size of the temporary file increases continuously after the size of the free space reaches the minimum size (300 MB) of the free space that should be secured (see a section B in FIG. 6, for example), a part of the storage area allocated to the swap file is gradually released by the swap file size adjustment process 311 in the logical partition p8.

In the section B, the area equivalent to the above-mentioned reduction size of the swap file is released from the storage area that has been allocated to the swap file. The released storage area is allocated to the temporary file. The size of the swap file is less than the swap file prescribed size in the section B. Accordingly, a storage area of a deficient size is complemented to the swap file in the step S411 at the next boot time so that the size of the swap file will become the prescribed swap file size. That is, since what is necessary is to regenerate a part of the swap file at the next boot time, a period of the regeneration of the swap file is shortened in comparison with a case where the swap file is regenerated as a whole. In this way, the logical partition p8 is shared by the swap file and the temporary file in the embodiment.

When the entire storage area that has been allocated to the swap file is released (see a section C in FIG. 6, for example), all the residual free space is allocated to the temporary file in the logical partition p8. That is, the entire storage area of the logical partition p8 is allocated to the temporary file.

Although the present invention is described using the above-mentioned embodiment, the present invention is not limited to the above-mentioned embodiment. For example, the image forming apparatus 102 may not be provided with the function to retrieve a hole position by scanning a swap file.

The above-mentioned embodiment describes the configuration that determines whether there is a hole on a swap file when it is determined that there is a swap file in the step S402. However, an apparatus that employs relatively old Linux may not have the function to retrieve a hole position by scanning a swap file. Such a configuration cannot reduce the degradation of the usability resulting from the boot in a boot mode different from a boot mode of the last boot time.

In such a case, what is necessary is to execute a swap space activation process in FIG. 7A instead of the swap space activation process in FIG. 4.

Figure 7:
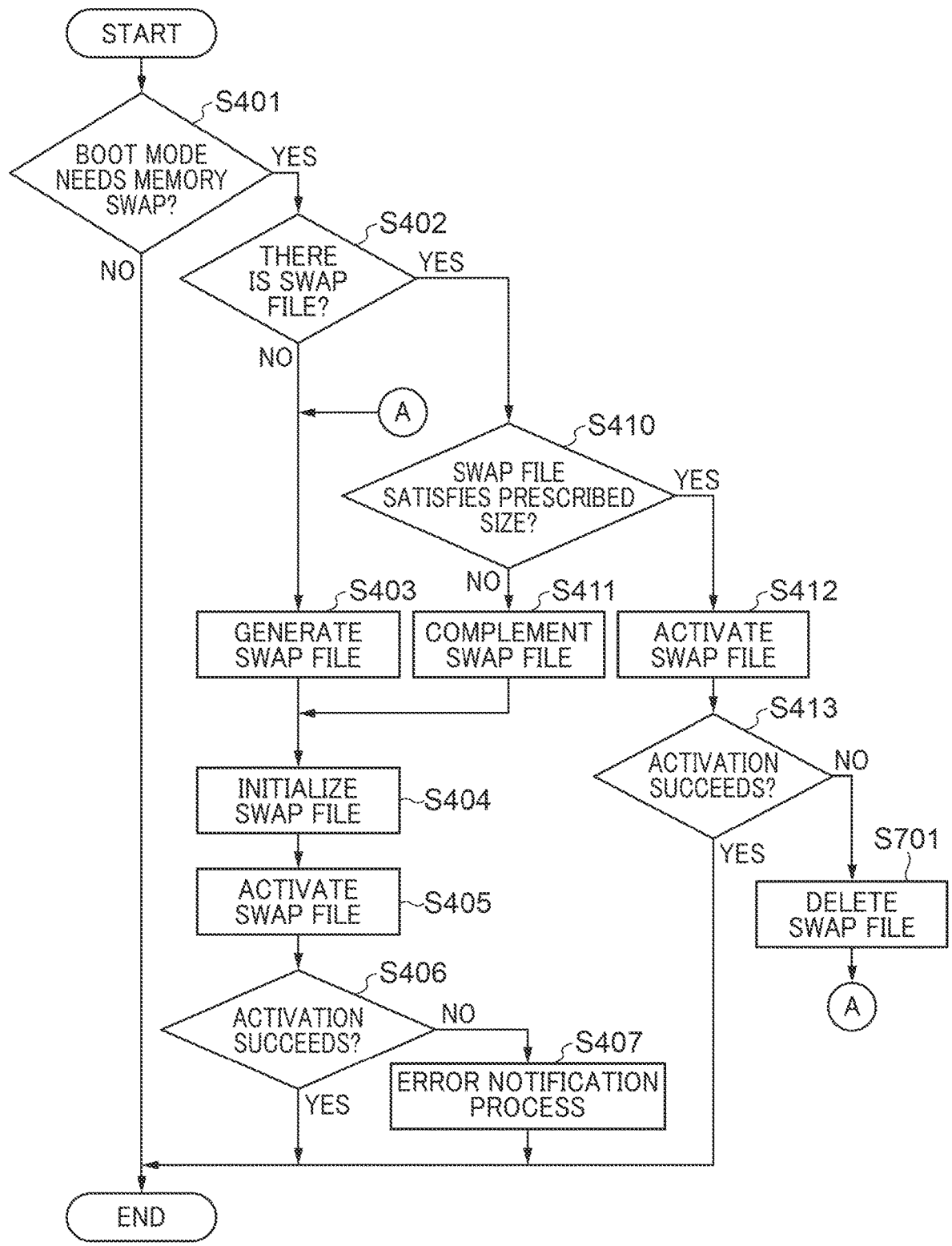
FIG. 7 is a flowchart showing other procedures of the swap space activation process in the step S305 in FIG. 3.

FIG. 7 is a flowchart showing other procedures of the swap space activation process in the step S305 in FIG. 3. Since the swap space activation process in FIG. 7 is similar to the swap space activation process in FIG. 4, procedures different from the swap space activation process in FIG. 4 will be particularly described hereinafter.

As shown in FIG. 7, the CPU 121 executes the process in the steps S401 and S402. When it is determined that there is no swap file in the step S402, the process proceeds to the step S403. After that, the process similar to the swap space activation process in FIG. 4 is performed. When it is determined that there is a swap file in the step S402, the process proceeds to the step S410.

When it is determined that the size of the swap file is less than the prescribed swap file size in the step S410, the process proceeds to the step S411. After that, the process similar to the swap space activation process in FIG. 4 is performed. When it is determined that the size of the swap file satisfies the prescribed swap file size in the step S410, the process proceeds to the step S412 and proceeds to the step S413 after that.

When it is determined that the activation of the swap file succeeds in the step S413, the CPU 121 finishes this process. When it is determined that the activation of the swap file does not succeed in the step S413, the CPU 121 deletes the swap file (a step S701), proceeds with the process to the step S403, and performs the process similar to the swap space activation process in FIG. 4 after that.

Even in the case where the apparatus does not have the function to retrieve a hole position by scanning a swap file, when the boot mode that preferentially secures an area storing a temporary file in the built-in storage unit 130 is set, a part of the swap file stored in the built-in storage unit 130 is deleted on the basis of the status of use of the built-in storage unit 130. When the boot mode that secures an area storing a swap file in the built-in storage unit 130 is set, the swap file concerned is complemented so that the size of the swap file stored in the built-in storage unit 130 will become a prescribed size. Thereby, the similar effect as the above-mentioned embodiment can be obtained.

Figure 8:
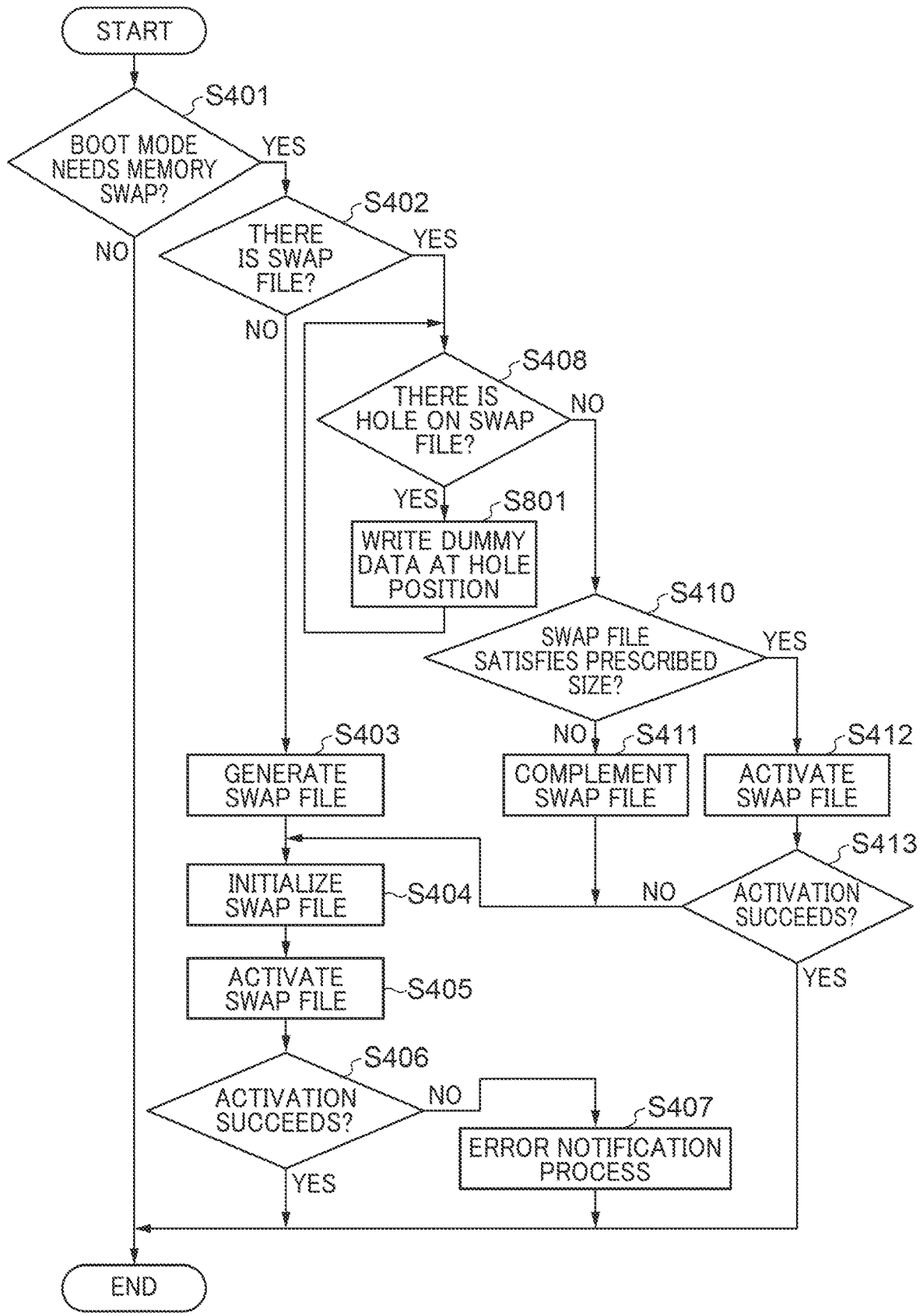
FIG. 8 is a flowchart showing still other procedures of the swap space activation process in the step S305 in FIG. 3.

Moreover, when it is determined that there is a hole on the swap file in the step S408, dummy data may be written in the hole portion detected as shown in a step S801 in FIG. 8.

FIG. 8 is a flowchart showing still other procedures of the swap space activation process in the step S305 in FIG. 3. Since the swap space activation process in FIG. 8 is similar to the swap space activation process in FIG. 4, procedures different from the swap space activation process in FIG. 4 will be particularly described hereinafter.

As shown in FIG. 8, the CPU 121 executes the process in the steps S401 through S408. When it is determined that there is no hole on the swap file in the step S408, the process proceeds to the step S410. After that, the process similar to the swap space activation process in FIG. 4 is performed. When it is determined that there is a hole on the swap file in the step S408, the CPU 121 writes dummy data in the position of the hole concerned (the step S801). After that, the process returns to the step S408. In this way, in the embodiment, a recovery process is performed so as to erase the hole on the swap file. Thereby, the existing swap file is used effectively and the regeneration of a swap file becomes unnecessary.

It should be noted that the apparatus may control to execute either of the swap space activation process in FIG. 4 and the swap space activation process in FIG. 8 on the basis of the type or the characteristic of the built-in storage unit 130.

Moreover, although the above-mentioned embodiment describes the configuration that deletes a part of a swap file by releasing from the end area of the storage area allocated to the swap file, this configuration is not indispensable. For example, a head area or a middle area of the storage area allocated to the swap file may be released.

Moreover, the maximum size of the temporary file written in the logical partition p8 may be estimated on the basis of a data writing performance the logical partition p8. And the reduction size of the swap file may be calculated on the basis of the estimated maximum size. Thereby, the area storing a temporary file that is needed after booting is secured in the logical partition p8.

Moreover, the size of the area storing a temporary file that is needed for a predetermined period from current time may be estimated on the basis of a past record. And the reduction size of the swap file may be calculated on the basis of the estimated size. For example, the size of the storage area allocated to the temporary file from the last booting to the current booting is calculated. And the size of the area that is needed for a predetermined period from current time is estimated on the basis of the calculated result. It should be noted that a size to which a certain coefficient is multiplied by considering variation and accuracy may be used as the reduction size of the swap file. Thereby, the area storing a temporary file that is needed after booting is secured in the logical partition p8.

Furthermore, the reduction size of the swap file may be calculated on the basis of the minimum size of the free space that should be secured and is set corresponding to the boot mode set in the step S303. For example, when a boot mode is used for downloading large capacity data, the minimum size of the free space that should be secured is set larger. In the meantime, when a boot mode other than the mode used for downloading large capacity data, the minimum size of the free space that should be secured is set smaller. Thereby, the storage area allocated to the swap file in the logical partition p8 can be allocated to the area storing the temporary file according to the boot mode set.

Moreover, the reduction size of the swap file may be calculated on the basis of information provided from a process other than swap file size adjustment process 311. For example, the information showing the size of the temporary file that will be written in the logical partition p8 in the update process 320 (a control process) including the process of storing the temporary file in the logical partition p8 is provided. The reduction size of the swap file is calculated on the basis of this information. Thereby, the area storing a temporary file that is needed by the executing process is secured in the logical partition p8.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-004478, filed Jan. 14, 2022, which is hereby incorporated by reference herein in its entirety.

What is claimed is:

1. An information processing apparatus comprising:
a memory;
a storage unit configured to store a swap file used as a substituted storage area of the memory; and
at least one processor that executes instructions stored in the memory to:
set either of a first boot mode that secures an area storing a temporary file in the storage unit and a second boot mode that secures an area storing the swap file in the storage unit;
delete a part of the swap file stored in the storage unit based on a status of use of the storage unit and maintain a remaining part of the swap file, in a case where the first boot mode is set; and
complement the swap file by adding to the remaining part of the swap file so that a size of the swap file stored in the storage unit becomes a prescribed size, in a case where the second boot mode is set when booting the information processing apparatus after booting the information processing apparatus in the first boot mode.

2. The information processing apparatus according to claim 1, wherein the first boot mode is a boot mode for maintaining and preserving at least one of hardware and software of the image forming apparatus so that the image forming apparatus will be normally booted in the second boot mode.

3. The information processing apparatus according to claim 2, wherein the first boot mode is a boot mode for updating firmware of the information processing apparatus.

4. The information processing apparatus according to claim 2, wherein the first boot mode is a boot mode used in assembling the information processing apparatus at a factory and in inspecting the information processing apparatus.

5. The information processing apparatus according to claim 2, wherein the first boot mode is a boot mode for degenerating a part of functions of the firmware of the information processing apparatus.

6. The information processing apparatus according to claim 1, wherein the second boot mode is a boot mode for enabling a normal operation of the information processing apparatus.

7. The information processing apparatus according to claim 1, wherein the at least one processor executes instructions in the memory to delete the part of the swap file stored in the storage unit so that a size of a free space in the storage unit becomes a predetermined size in the case where the first boot mode is set.

8. The information processing apparatus according to claim 1, wherein the at least one processor executes instructions in the memory to calculate a reduction size of the swap file stored in the storage unit based on a prescribed size corresponding to the boot mode set.

9. The information processing apparatus according to claim 1, wherein the at least one processor executes instructions in the memory to:

estimate a maximum size of the temporary file written in a partition of the storage unit in which the temporary file is stored based on a data writing performance to the partition; and calculate a reduction size of the swap file stored in the storage unit based on the maximum size estimated.

10. The information processing apparatus according to claim 1, wherein the at least one processor executes instructions in the memory to:

estimate a size of an area storing the temporary file needed in the storage unit based on a past record; and calculate a reduction size of the swap file stored in the storage unit based on the size estimated.

11. The information processing apparatus according to claim 1, wherein the at least one processor executes instructions in the memory to calculate a reduction size of the swap file stored in the storage unit based on information provided from a control process including a process storing the temporary file in the storage unit.

12. A control method for an information processing apparatus equipped with a memory and a storage unit storing a swap file used as a substituted storage area of the memory, the control method comprising:

securing an area storing a temporary file in the storage unit by deleting a part of the swap file stored in the storage unit based on a status of use of the storage unit and maintaining a remaining part of the swap file when booting the information processing apparatus in a first boot mode; and securing an area storing the swap file in the storage unit by complementing the swap file by adding to the remaining part of the swap file so that a size of the swap file stored in the storage unit becomes a prescribed size when booting the information processing apparatus in a second boot mode after booting the information processing apparatus in the first boot mode.

13. A non-transitory computer-readable storage medium storing a control program causing a computer to execute a control method for an information processing apparatus equipped with a memory and a storage unit storing a swap file used as a substituted storage area of the memory, the control method comprising:

securing an area storing a temporary file in the storage unit by deleting a part of the swap file stored in the storage unit based on a status of use of the storage unit and maintaining a remaining part of the swap file when booting the information processing apparatus in a first boot mode; and securing an area storing the swap file in the storage unit by complementing the swap file by adding to the remaining part of the swap file so that a size of the swap file stored in the storage unit becomes a prescribed size when booting the information processing apparatus in a second boot mode after booting the information processing apparatus in the first boot mode.

* * * * *